June 2, 1931.  G. E. ERIKSON  1,808,644
STOPPLE
Filed Oct. 12, 1929
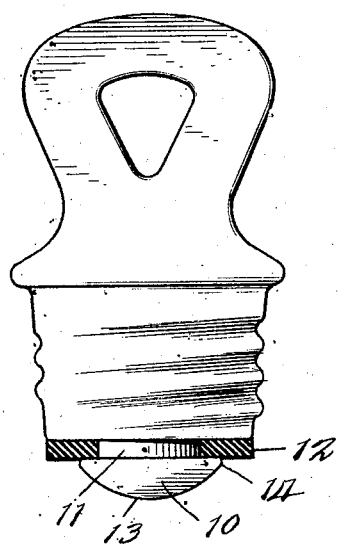
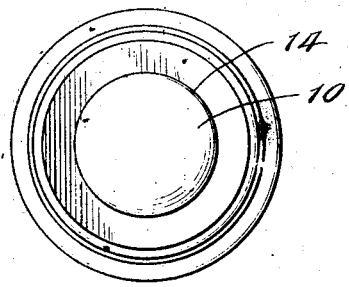
INVENTOR
GUST E. ERIKSON
by his attorneys
Howson and Howson Patented June 2, 1931

1,808,644

UNITED STATES PATENT OFFICE

GUST E. ERIKSON, OF FAIRFIELD, CONNECTICUT, ASSIGNOR TO THE BRYANT ELECTRIC COMPANY, OF BRIDGEPORT, CONNECTICUT, A CORPORATION OF CONNECTICUT

STOPPLE

Application filed October 12, 1929. Serial No. 399,289.

This invention has to do with a stopple and is especially concerned with that sort which is made of molded material and is designed for use with hot water bottles. Such a stopple carries a washer, usually of rubber, which has a central hole that enables it to be pressed over the enlarged head of a projection extending from the inner end of the stopple, that is, the end that goes into the bottle. The purpose of the washer is to seal the joint between the stopple and an annular ledge molded in the rubber material that forms the neck of the bottle. There is, in the neck of the bottle, a screw shell socket into which the stopple threads and this shell has an annular inturned flange at its lower end which rests on the said ledge and is engaged by the washer on the stopple.

It has been found that the hole in the inner end of the screw socket, which should be of a size and shape to receive the enlarged head on the stopple in order to permit the washer to rest on the flange of the socket, is not always in this desired condition. In the course of molding the neck of the bottle, the socket is put in place in the plastic and a plug is put in it to preserve its shape during the pressing operation, but the plug is not always fully threaded in and the results is that the inner or flanged end of the shell is not supported by the plastic. The pressing therefore deforms this end and makes the hole elliptical in shape. In that event the enlarged head on the stopple strikes the flange instead of passing through the hole since the elliptical shape causes a narrowing of the hole in one direction. The ordinary flat ended projection on the stopple merely rests on such a deformed flange and so prevents the washer from engaging the flange to give an effective seal. Leakage results.

The present invention provides a way of rendering the effect of such deformation of the screw shell immaterial and at the same time it overcomes what has seriously handicapped the extensive use of molded stopples, namely, the tendency to breakage in the enlarged head which holds the washer in place. In the forms of molded stopple known heretofore, this head was formed as a disc, that is, flat on its outer face, this being an approximation of the shape of the older type of metallic stopple. Inasmuch as a stopple is heavier at its inner end, whenever one is dropped it is that end which strikes first, hence the enlarged head receives the impact. The flat disc type does not withstand this common incident of normal use and breakage of the head is found to occur frequently.

In the accompanying drawings—

Figure 1 is a side elevation of a stopple embodying the invention; and

Figure 2 is an end view of the same.

As shown in the accompanying drawings, the head 10 on the projection 11 that receives the washer 12 is convexly curved on its outer face 13. The head 10 need be no thicker at the side edges 14 than in the case of a flat disc-like type of head. Whatever the explanation may be, it is found that this construction, in which the outer face of the head is formed as a convexly curved surface merging into the side edges gradually rather than sharply, is most effective in preventing breakage.

When screwed into the neck of the bottle, the curved-surface head 10 engages the flange at the inner end of the screw shell if the hole in the inner end of the shell is deformed from the circular as described above. Due to the curvature of the end surface of the projection it spins the edges of the flange enabling the head to pass through enough to seat the washer on the flange.

I claim—

A stopple for hot water bottles comprising a screw threaded portion for engagement with a socket in the neck of the bottle, a washer at the lower end of said screw threaded portion for engagement with a flange at the inner end of the socket, and an end projection on the stopple having an enlarged head retaining the washer, said head being convexly curved and of sufficient size to engage the edges of the flange to shape same for proper seating of the washer thereon when said flange is deformed.

In testimony whereof I have signed my name to this specification.

GUST E. ERIKSON.